Patented Oct. 23, 1923.

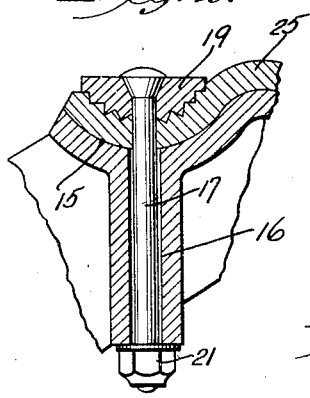

1,471,914

UNITED STATES PATENT OFFICE.

VICTOR W. PAGÉ, OF NEW YORK, N. Y.

BRAKE STRUCTURE.

Original application filed March 24, 1921, Serial No. 455,039. Divided and this application filed December 14, 1921. Serial No. 522,311.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Brake Structure, of which the following is a full, clear, and exact description.

The present invention relates to new and useful improvements in brakes and it pertains more particularly to internal brakes for vehicles and especially vehicles of the self-propelled type.

This application is a division of my application filed March 24, 1921, and bearing Serial No. 455,039, for internal brake.

It is one of the objects of the present invention to provide a new and improved form of brake band securing means.

It is a further object of the invention to provide a securing means for brake bands in which the brake band is placed under tension and caused to conform to and contact with the shoe throughout the length thereof.

It is a further object of the invention to so construct the securing means of the brake band that the ends thereof are prevented from contacting with the brake drum during the braking operation and by this action cause a buckling of the band.

It is a further object of the invention to provide a securing means for brake bands which permits of a ready removal of the brake band for the purpose of replacement or repair.

With the above and other objects in view, reference is had to the accompanying drawings, in which Figure 1 is a view partly in elevation and partly in section of an internal brake, the bands and their securing means being constructed in accordance with the present invention;

Fig. 2 is an enlarged detail sectional view of a brake band securing means.

Referring more particularly to the drawings, the reference character 5 designates a brake drum, and mounted internally thereof are two shoes 6. Each of the shoes 6 is provided on one end with a lug 7 and each of said lugs is provided with a curved seat 8 adapted to engage a stub shaft 9 or the like, which serves as the pivotal point of said shoes. Mounted between the opposite ends of the shoes 6, is a cam member 10, which serves as the means for spreading the shoes. Connecting the shoes 6 are springs 12 and said springs 12 serve to hold the shoes in position within the brake drum and out of contact therewith. So far as described, the structure illustrated is common to internal brakes.

In carrying out the present invention the brake shoes 6 are each provided near each of their ends with a curved seat 15, and extending through said curved seat 15, is a passage 16 adapted to receive a bolt 17 or the like. The bolt 17 has a head 18, and said head 18 is adapted to engage a washer 19 or the like. This washer 19 is provided with a curved face 20, the curve of which preferably conforms to the curvature of the curved seat 15. This curved edge is serrated or roughened as shown.

The reference character 25 designates the brake band which is formed of any suitable friction material commonly used for the purpose, and said brake bands are passed around the outer curved surface of the shoes 6, as shown, with their ends lying in the curved seats 15.

In the placement of these brake bands, one end is positioned within one of the curved seats, after which the washer 19 is engaged therewith and by tightening the nut 21 said washer grips the brake band and causes the same to conform in shape to the shape of the curved seat, the serrated face of said washer binding into the brake band. After this end has been so arranged, the opposite end is passed into engagement with the curved seat and the washer 19 thereon is likewise engaged with the brake band and the nut 21 is tightened to pull the brake band firmly into the curved seat 15. As this operation takes place, it is obvious that the brake band is placed under tension, and by this tension is caused to conform throughout its length to the shoe to which it is fastened. Furthermore, by this construction, it is apparent that the ends of the brake band are so positioned with respect to the drum that they cannot be engaged thereby and thus all possibility of buckling of the brake band is eliminated.

When it is desired to remove or replace a brake band, it is only necessary to loosen the nut 21, after which the bolts 17 may be removed and the washers 19 disengaged from the brake band 25. This action permits of the entire removal of the brake band.

From the foregoing it is apparent that the present invention provides a new and novel means for securing brake bands to their shoes in internal brakes, and that owing to the construction of the present device, the shoes are prevented from buckling by reason of contact of their ends with the brake drum during the braking operation.

I claim:

A shoe having curved seats, a friction surface, and means for securing the friction surface to said shoe in the curved seats, said means comprising blocks having an opening therethrough and a curved serrated face and a bolt passing through said blocks and shoe and adapted to cause the curved serrated face of the blocks to seat in the curved seats, the serrations on the curved face of the blocks serving to place the friction surface under tension on the shoe.

VICTOR W. PAGÉ.